(12) United States Patent
Chen

(10) Patent No.: US 11,709,556 B2
(45) Date of Patent: Jul. 25, 2023

(54) MOUSE DEVICE

(71) Applicant: Chicony Electronics Co., Ltd., New Taipei (TW)

(72) Inventor: Wen-Bin Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/584,707

(22) Filed: Jan. 26, 2022

(65) Prior Publication Data

US 2022/0253159 A1     Aug. 11, 2022

(30) Foreign Application Priority Data

Feb. 9, 2021    (TW) .................................. 110105046

(51) Int. Cl.
     *G06F 3/0354*      (2013.01)

(52) U.S. Cl.
     CPC ................. *G06F 3/03543* (2013.01)

(58) Field of Classification Search
     CPC .................................................. G06F 3/03543
     See application file for complete search history.

(56) References Cited

U.S. PATENT DOCUMENTS

| | | | | |
|---|---|---|---|---|
| 2005/0174330 A1* | 8/2005 | Varga | .................. | G06F 3/03543 345/163 |
| 2005/0178633 A1* | 8/2005 | Liao | ...................... | H02G 11/02 191/12.4 |
| 2006/0152490 A1* | 7/2006 | Ho | ...................... | G06F 3/03543 345/163 |
| 2006/0170655 A1* | 8/2006 | Hou | .................... | G06F 3/03543 345/163 |
| 2006/0209026 A1* | 9/2006 | Balmes | ............... | G06F 3/03543 345/163 |

FOREIGN PATENT DOCUMENTS

CN            210836024 U     6/2020

\* cited by examiner

*Primary Examiner* — Ariel A Balaoing
(74) *Attorney, Agent, or Firm* — Muncy, Geissler, Olds & Lowe, P.C.

(57) ABSTRACT

A mouse device includes a body, a cover plate, a covering layer, and an adhesive layer. The cover plate is disposed on the body and includes a button. The covering layer covers the cover plate, and the material of the covering layer is different from the material of the cover plate. The adhesive layer is bound between the cover plate and the covering layer, and the adhesive layer has a hollow portion corresponding to the button.

12 Claims, 6 Drawing Sheets

MOUSE DEVICE

CROSS-REFERENCE TO RELATED APPLICATION

This non-provisional application claims priority under 35 U.S.C. § 119(a) to Patent Application No. 110105046 filed in Taiwan, R.O.C. on Feb. 9, 2021, the entire contents of which are hereby incorporated by reference.

BACKGROUND

Technical Field

The instant disclosure relates to peripherals for computers, in particular, to a mouse device.

Related Art

Mice are common input devices for computers. Regarding the operations of the mouse, the button is a component which is most frequently operated. For example, the user may select certain item(s) or trigger certain action(s) by pressing the button and controlling the cursor of the mouse. Therefore, the operation feeling of the button is important for the user.

SUMMARY

In general, the casings of the mice known to the inventor are made of rigid plastic materials. However, the casings made of rigid plastic materials have limited changes in appearance. As a result, the mice known to the inventor cannot provide different visual feelings for the users. Moreover, the rigid plastic material cannot provide proper touch feeling and comfortableness for the user, thereby affecting the operation feeling of the user.

In view of this, in one embodiment, a mouse device is provided. The mouse device comprises a body, a cover plate, a covering layer, and an adhesive layer. The cover plate is disposed on the body and comprises a button. The covering layer covers the cover plate, and a material of the covering layer is different from a material of the cover plate. The adhesive layer is bound between the cover plate and the covering layer. The adhesive layer has a hollow portion, and the hollow portion corresponds to the button.

As above, in the mouse device of one or some embodiments of the instant disclosure, the covering layer covers the cover plate, thereby improving the aesthetic and the operation comfortableness of the mouse device. Moreover, the touch feeling of the mouse device can be adjusted according to practical user requirements. Furthermore, the hollow portion is provided on the adhesive layer between the cover plate and the covering layer, and the hollow portion corresponds to the button. Hence, without changing the appearance of the mouse device, the stiffness of the stacked structure having the button, the adhesive layer, and the covering layer can be adjusted through the hollow portion, thereby providing proper operation feeling for the user.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
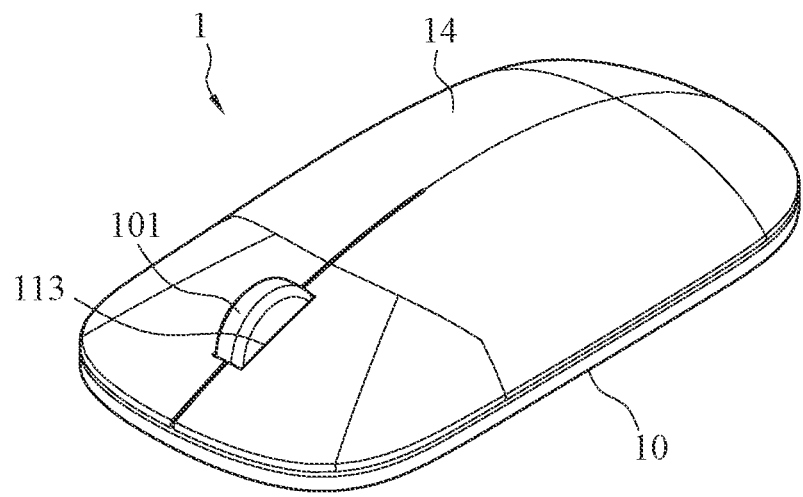
FIG. 1 illustrates a perspective view of a mouse device according to a first embodiment of the instant disclosure.
Figure 2:
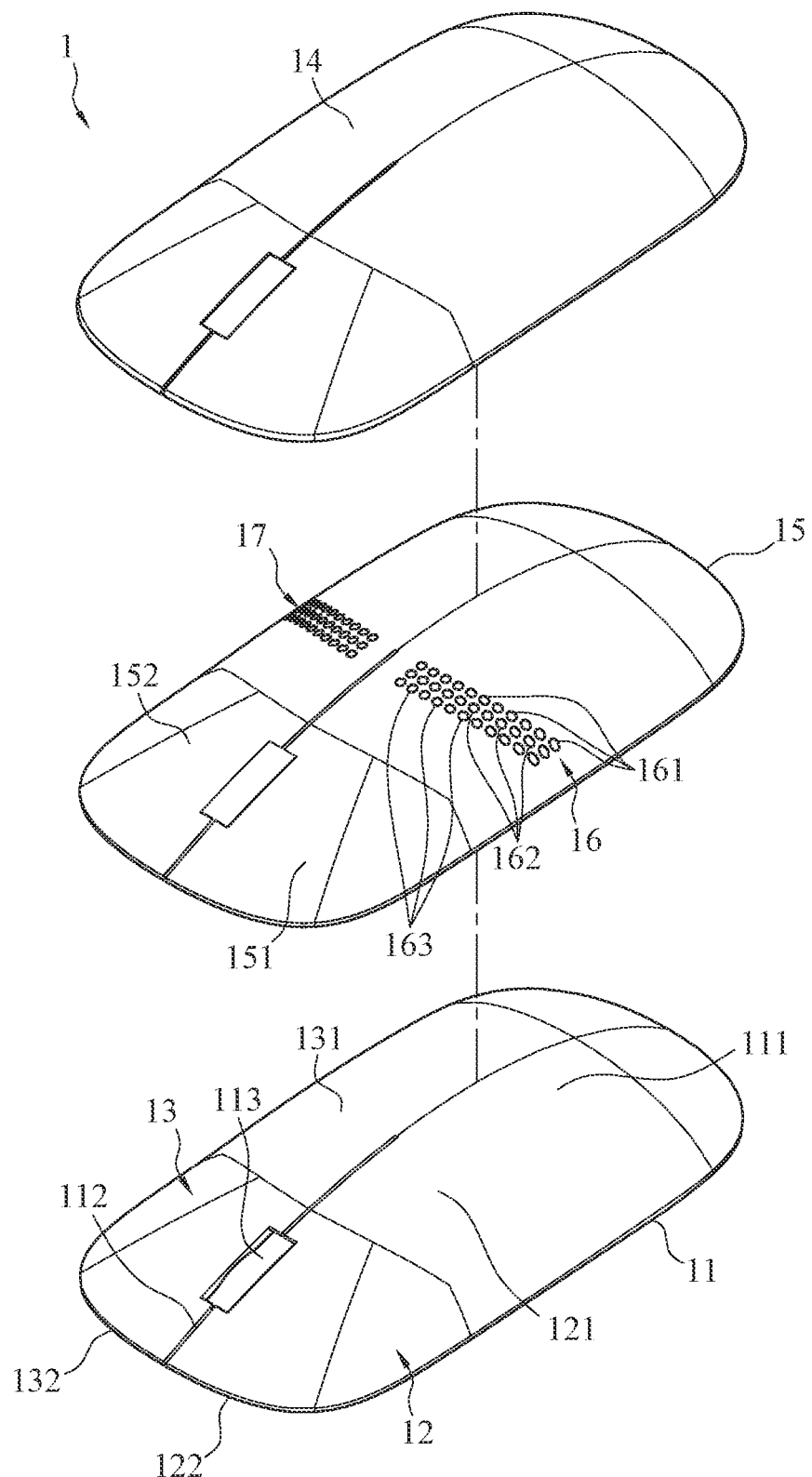
FIG. 2 illustrates a partial exploded view of the mouse device of the first embodiment, from the top perspective.
Figure 3:
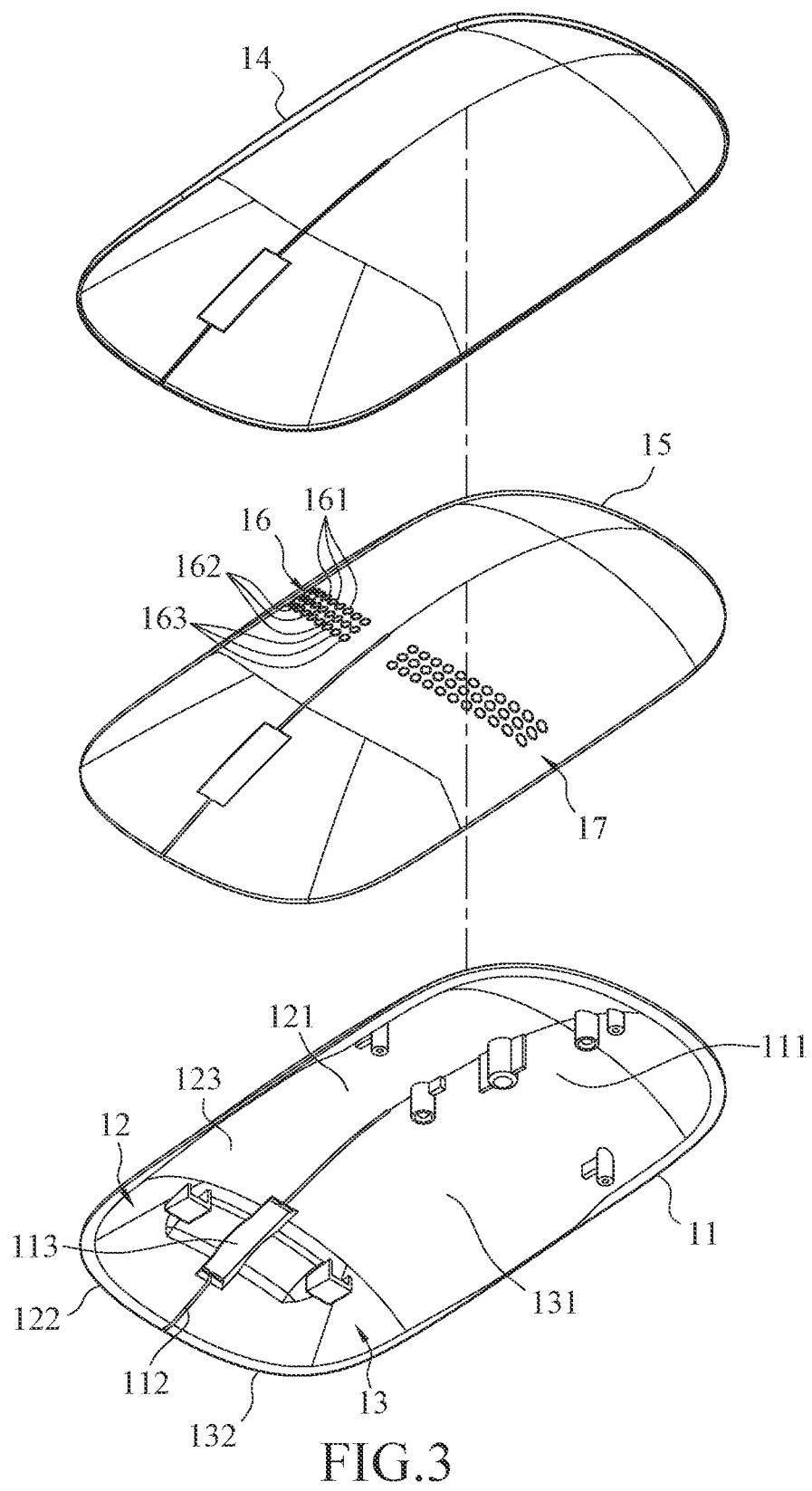
FIG. 3 illustrates a partial exploded view of the mouse device of the first embodiment, from the bottom perspective.
Figure 4:
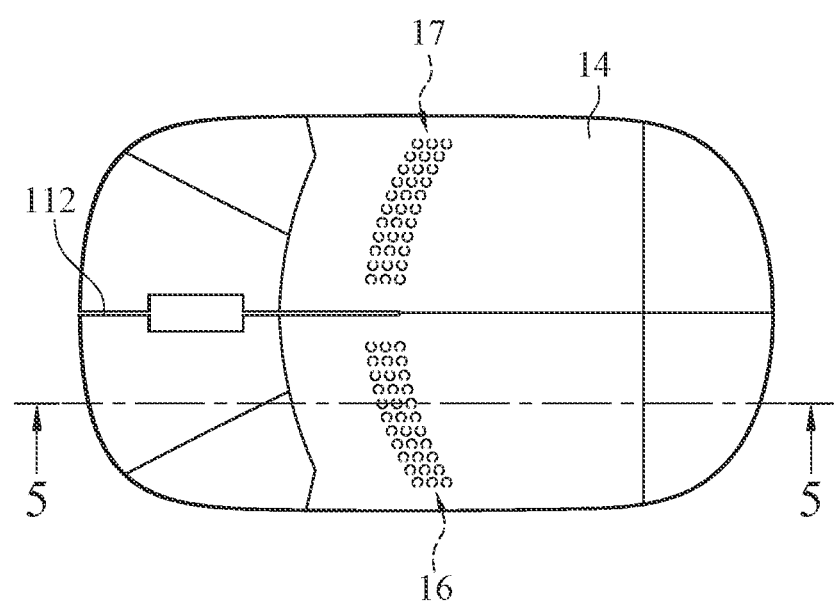
FIG. 4 illustrates a top view of the mouse device of the first embodiment.

FIG. 1 illustrates a perspective view of a mouse device 1 according to a first embodiment of the instant disclosure. FIG. 2 illustrates a partial exploded view of the mouse device of the first embodiment, from the top perspective. FIG. 3 illustrates a partial exploded view of the mouse device of the first embodiment, from the bottom perspective. FIG. 4 illustrates a top view of the mouse device of the first embodiment. As shown in FIGS. 1 to 4, the mouse device 1 is an input device for a computer, and the mouse device 1 is provided for controlling the mouse curser of the computer (e.g., a personal computer, a notebook computer, or a tablet computer) to move, to select item(s), or to perform other actions.

In some embodiments, specifically, the mouse device 1 may be a mechanical mouse, an optical mouse, or a laser mouse. With regard to the transmission method, the mouse device 1 may be a wired mouse. For example, the mouse device 1 may be connected to the port (e.g., a USB port) of the computer through a cable, so that the mouse device 1 can transmit data to the computer through the cable. Alternatively, the mouse device 1 may be a wireless mouse, and the mouse device can wirelessly transmit data to the computer through emitting infrared radiofrequency signals or Bluetooth signals.

As shown in FIGS. 1 to 4, the mouse device 1 comprises a body 10, a cover plate 11, a covering layer 14, and an adhesive layer 15. In this embodiment, the body 10 is a hollowed housing for receiving components (e.g., microswitch(es), circuit board(s), sensor(s), or the like). The cover plate 11 is disposed on the body 10 and comprises at least one button 12. In this embodiment, the mouse device 1 is a two-button mouse and comprises two buttons 12, 13 (namely, the right button and the left button), and the two buttons 12, 13 are pressibly disposed on the body 10, but embodiments are not limited thereto. In some embodiments, the mouse device 1 may be a single-button mouse or may be a mouse having three or more buttons.

As shown in FIGS. 1 to 4, the cover plate 11 comprises a rear plate 111, and the two buttons 12, 13 are elongated plates integrally extending from the rear plate 111, respectively. In this embodiment, the button 12 comprises a pivot end 121 and a free end 122 opposite to the pivot end 121. The pivot end 121 is an end of the button 12 served as the fulcrum for swinging motion, and the free end 122 is an end of the button 12 which is not fastened so as to swing freely. In this embodiment, the pivot end 121 is integrally connected to the rear plate 111, and the free end 122 extends away from the rear plate 111 and is not fastened. Therefore, when the button 12 is pressed, the button 12 swings relative to the rear plate 111 by taking the pivot end 121 as the fulcrum, so that the button 12 moves downwardly and moves toward the body 10. Similarly, the button 13 comprises a pivot end 131 and a free end 132 opposite to the pivot end 131. The pivot end 131 is an end of the button 13 served as the fulcrum for swinging motion, and the free end 132 is an end of the button 13 which is not fastened so as to swing freely. In this embodiment, the pivot end 131 is integrally connected to the rear plate 111, and the free end 132 extends away from the rear plate 111 and is not fastened. Therefore, when the button 13 is pressed, the button 13 swings relative to the rear plate 111 by taking the pivot end 131 as the fulcrum, so that the button 13 moves downwardly and moves toward the body 10.

In some embodiments, the two buttons 12, 13 and the rear plate 111 may be parts of an assembled structure. For example, the pivot end 121 of the button 12 and the pivot end 131 of the button 13 may be assembled with the rear plate 111 by, for example, gluing, engaging, locking, or other ways, but embodiments are not limited thereto.

As shown in FIGS. 1 to 4, in this embodiment, a through hole 113 is between the two buttons 12, 13, and the through hole 113 is in communication with inside of the body 10. A wheel 101 is further disposed in the body 10, a portion of the wheel 101 protrudes from the through hole 113, and the portion of the wheel 101 is exposed from the cover plate 11 so as to be operated by the user. For example, the wheel 101 is provided for being rolled by the user to allow the user to scroll the page on the computer device up and down.

As shown in FIGS. 1 to 4, the shape of the covering layer 14 corresponds to the shape of the cover plate 11, and the covering layer 14 covers the cover plate 11. Moreover, the shape of the adhesive layer 15 corresponds to the shape of the covering layer 14 and the shape of the cover plate 11, and the adhesive layer 15 is bound between the cover plate 11 and the covering layer 14, so that the covering layer 14 and the cover plate 11 can be attached with each other. The material of the covering layer 14 is different from the material of the cover plate 11. For example, the body 10 and the cover plate 11 are made of rigid plastic(s) which may be, for example, polycarbonate (PC), acrylonitrile butadiene styrene (ABS) resin, polyethylene terephthalate (PET), or the like. On the other hand, the covering layer 14 may be a leather material layer (e.g., genuine leathers or artificial leathers) or a fabric material layer (e.g., cotton fabrics, linen fabrics, nylon fabrics, nonwoven fabrics super fabrics, polyester fabrics, oxford fabrics, or the like). Accordingly, by covering the covering layer 14 on the cover plate 11, the aesthetic and the operation comfortableness of the mouse device 1 can be improved. Moreover, the touch feeling of the mouse device 1 can be adjusted according to practical user requirements. For example, when the covering layer 14 is a fabric material layer, the covering layer 14 can not only provide moisture absorption and air permeability functions for the mouse device 1 but also allows the mouse device 1 to have soft and comfortable touch feeling. In another example, when the covering layer 14 is a leather material layer, the mouse device 1 can have a fancy appearance and have of the overall appearance of the mouse device 1 can have both durability and air permeability functions.

As shown in FIGS. 1 to 4, the adhesive layer 15 may be a thermoplastic hot-melt adhesive film and is disposed on the surface of the covering layer 14. During the assembling process, the covering layer 14 and the adhesive layer 15 are covered on the surface of the cover plate 11. Then, the adhesive layer 15 is heated to be softened and to have adhesion function, so that the adhesive layer 15 can be bound between the cover plate 11 and the covering layer 14. Therefore, after the adhesive layer 15 is cooled and solidified, every portion of the cover plate 11 and every portion of the covering layer 14 can be combined with each other quickly and evenly. In some embodiments, the adhesive layer 15 may be a thermosetting hot-melt adhesive film or a typical glue layer, but embodiments are not limited thereto.

As shown in FIGS. 1 to 4, the adhesive layer 15 further has at least one hollow portion 16 to correspond to at least one of the buttons. The hollow portion 16 is a region of the adhesive layer 15 which is hollowed. In this embodiment, the adhesive layer 15 has the hollow portion 16, and the hollow portion 16 corresponds to the button 12. Specifically, in this embodiment, the adhesive layer 15 has two partial adhesive regions 151, 152 respectively corresponding to the positions of the two buttons 12, 13, and the hollow portion 16 is formed on the partial adhesive region 151 to correspond to the button 12. Accordingly, the hollow portion 16 is provided on the adhesive layer 15 between the cover plate 11 and the covering layer 14, and the hollow portion 16 corresponds to the button 12. Hence, without changing the appearance of the mouse device 1, the stiffness of the stacked structure having the button 12, the adhesive layer 15, and the covering layer 14 can be adjusted through the hollow portion 16, thereby providing proper operation feeling for the user.

Specifically, in this embodiment, since the adhesive layer 15 and the covering layer 12 are stacked on the button 12, the stiffness of the button 12 can be increased. Hence, according to one or some embodiments of the instant disclosure, by having the hollow portion 16 at the region of the adhesive layer 15 corresponding to the button 12, the stiffness of the stacked structure having the button 12, the adhesive layer 15, and the covering layer 14 after the button 12, the adhesive layer 15, and the covering layer 14 are stacked with each other can be adjusted (for example, the stiffness of the stacked structure can be reduced), so that the mouse device 1 can provide a proper operation feeling for the user without changing the appearance of the mouse device 1. Moreover, depending on different operation requirements, the size, the position, or the shape of the hollow portion 16 may be adjusted. Therefore, the stacked structure having the button 12, the adhesive layer 15, and the covering layer 14 can have different stiffness values so as to meet different user requirements or product requirements.

As shown in FIGS. 1 to 4, in this embodiment, the adhesive layer 15 further has a hollow portion 17, and the hollow portion 17 corresponds to the button 13. In other words, in this embodiment, the hollow portion 17 is formed on the partial adhesive region 152 to correspond to the button 13. Therefore, the stiffness of the stacked structure having the button 13, the adhesive layer 15, and the covering layer 14 can be adjusted through the hollow portion 17, thereby providing proper operation feeling for the user. However, it is understood that, the embodiment having two hollow portions 16, 17 is provided as an illustrative example, but not limitations to the instant disclosure; in some embodiments, the adhesive layer 15 may have one hollow portion corresponding to one of the buttons.

Figure 5:
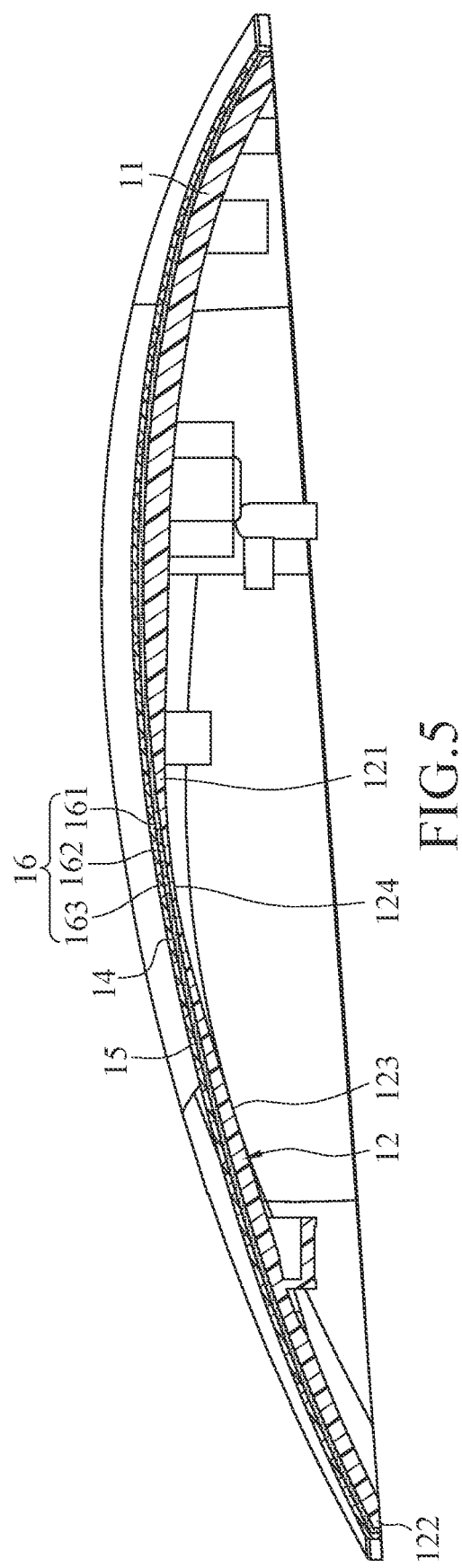
FIG. 5 illustrates a cross-sectional view along line 5-5 shown in FIG. 4.
Figure 6:
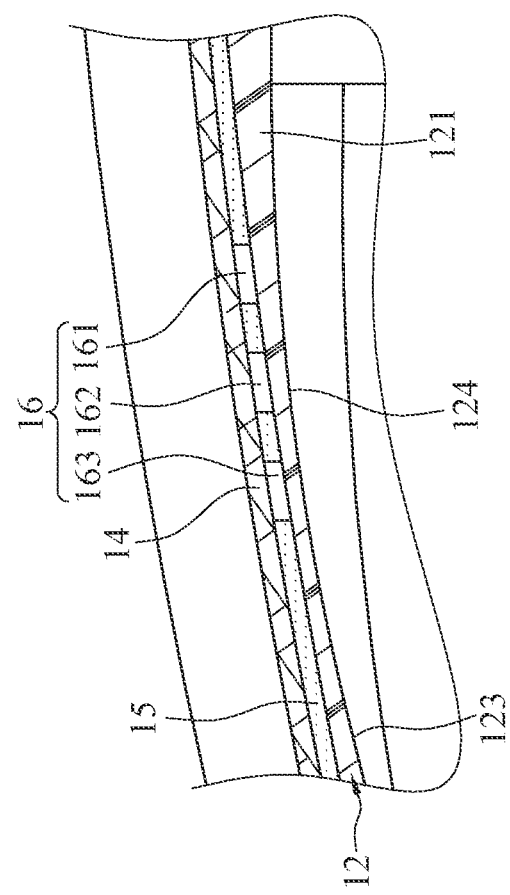
FIG. 6 illustrates an enlarged partial view of FIG. 5.

FIG. 5 illustrates a cross-sectional view along line 5-5 shown in FIG. 4. FIG. 6 illustrates an enlarged partial view of FIG. 5. As shown in FIGS. 4 to 6, taking the button 12 as an example, the position of the hollow portion 16 of the adhesive layer 15 is adjacent to the pivot end 121 of the button 12. In other words, in this embodiment, a distance between the hollow portion 16 and the pivot end 121 is less than the hollow portion 16 and the free end 122. Accordingly, the stiffness of the stacked structure having the button 12, the adhesive layer 15, and the covering layer 14 can be more efficiently adjusted through the hollow portion 16. Specifically, in general, most stress is concentrated at the pivot end 121 when the button 12 is pressed. Hence, according to one or some embodiments of the instant disclosure, the hollow portion 16 is adjacent to the pivot end 121, so that the stress generated upon pressing the button 12 can be reduced, so that the stiffness of the stacked structure having the button 12, the adhesive layer 15, and the covering layer 14 can be reduced. In some embodiments, the hollow portion 16 may correspond to other portions of the button 12. For example, the hollow portion 16 may directly correspond to the pivot end 121 or may be adjacent to the free end 122, and embodiments are not limited thereto.

In some embodiments, similarly, the hollow portion 17 of the adhesive layer 15 may be adjacent to or may directly correspond to the pivot end 131 of the button 13, or the hollow portion 17 of the adhesive layer 15 may be adjacent to other portions of the button 13 (e.g., the free end 132 of the button 13). As shown in FIG. 2, in this embodiment, the hollow portion 17 of the adhesive layer 15 is adjacent to the pivot end 131 of the button 13. Therefore, the stiffness of the stacked structure having the button 13, the adhesive layer 15, and the covering layer 14 can be more efficiently adjusted through the hollow portion 17.

As shown in FIG. 5, in this embodiment, the button 12 comprises an inner surface 123, and the inner surface 123 is a surface of the button 12 facing inside the body 10. The inner surface 123 further has a recessed region 124, and the recessed region 124 has a reduced thickness. Therefore, the stiffness of the stacked structure having the button 12, the adhesive layer 15, and the covering layer 14 can be more efficiently adjusted further through the recessed region 124 of the button 12 (for example, the stiffness of the stacked structure can be reduced), so that the mouse device 1 can provide a proper operation feeling for the user without changing the appearance of the mouse device 1. Moreover, depending on different operation requirements, the size, the position, or the shape of the recessed region 124 of the button 12 may be adjusted. Therefore, the stacked structure having the button 12, the adhesive layer 15, and the covering layer 14 can have different stiffness values so as to meet different user requirements or product requirements. In some embodiments, the surface of the recessed region 124 may be concave surface, so that the inner surface 123 of the button 12 has a smoother appearance.

Further, as shown in FIG. 5, the position of the recessed region 124 of the inner surface 123 of the button 12 may correspond to the hollow portion 16 of the adhesive layer 15. In this embodiment, both the hollow portion 16 of the adhesive layer 15 and the recessed region 124 of the button 12 are adjacent to the pivot end 121 of the button 12, so that the hollow portion 16 of the adhesive layer 15 and the recessed region 124 of the button 12 correspond to each other. In other words, in this embodiment, a distance between the recessed region 124 and the pivot end 121 of the button 12 is less than a distance between the recessed region 124 and the free end 122 of the button 12. Accordingly, the stiffness of the stacked structure having the button 12, the adhesive layer 15, and the covering layer 14 can be more efficiently adjusted further through the recessed region 124 of the button 12. In some embodiments, the hollow portion 16 of the adhesive layer 15 and the recessed region 124 of the button 12 may correspond to different portions of the button 12, and embodiments of the instant disclosure are not limited. In some embodiments, the inner surface of the button 13 may have a recessed region, and the stiffness of the stacked structure having the button 13, the adhesive layer 15, and the covering layer 14 can be more efficiently adjusted further through the recessed region of the button 13. Detailed description of the structure of the recessed region of the button 13 is omitted.

The hollow portions 16, 17 of the adhesive layer 15 may have several embodiments. For example, the sizes, the positions, the numbers of the two hollow portions 16, 17 may be the same or different from each other. Descriptions are provided in the following paragraphs along with accompanied drawings.

As shown in FIGS. 2 and 4, taking the hollow portion 16 an example, the hollow portion 16y comprise at least one line of through holes. For example, in this embodiment, the hollow portion 16 is formed by two or more lines of through holes. In this embodiment, the hollow portion 16 comprises a plurality of first through holes 161 arranged into a line, a plurality of second through holes 162 arranged into a line, and a plurality of third through holes 163 arranged into a line. The first through holes 161, the second through holes 162, and the third through holes 163 are arranged side-by-side. In this embodiment, the button 12 is an elongated plate, and the first through holes 161, the second through holes 162, and the third through holes 163 are spacedly arranged along the width direction of the button 12, but embodiments are not limited thereto. In some embodiments, the first through holes 161, the second through holes 162, and the third through holes 163 may be arranged along the length direction of the button 12. Alternatively, in another embodiment, the first through holes 161, the second through holes 162, and the third through holes 163 may be arranged not side-by-side (e.g., in an alternated configuration).

In some embodiments, the sizes, the numbers, or the positions of each of the first through holes 161, each of the second through holes 162, and each of the third through holes 163 of the hollow portion 16 may be the same or different from each other. As shown in FIGS. 2 and 4, in this embodiment, each of the first through holes 161, each of the second through holes 162, and each of the third through holes 163 are round holes with the same size. Accordingly, in this embodiment, since the hollow portion 16 has through holes arranged in multiple lines, the sizes of the through holes (namely, in this embodiment, the first through holes 161, the second through holes 162, and the third through holes 163) can be reduced. Therefore, the sizes of the through holes can be prevented from being too large to affect the appearance of the mouse device 1. Moreover, in this embodiment, the hollow portion 17 and the hollow portion 16 have the same structure and are arranged on the adhesive layer 15 symmetrically. For example, the two hollow portions 16, 17 are symmetrically arranged by taking the extension direction of the gap 112 as the axis of symmetry. In some embodiments, the structures of the two hollow portions 16, 17 may be different, or the two hollow portions 16, 17 may be arranged unsymmetrically.

Figure 7:
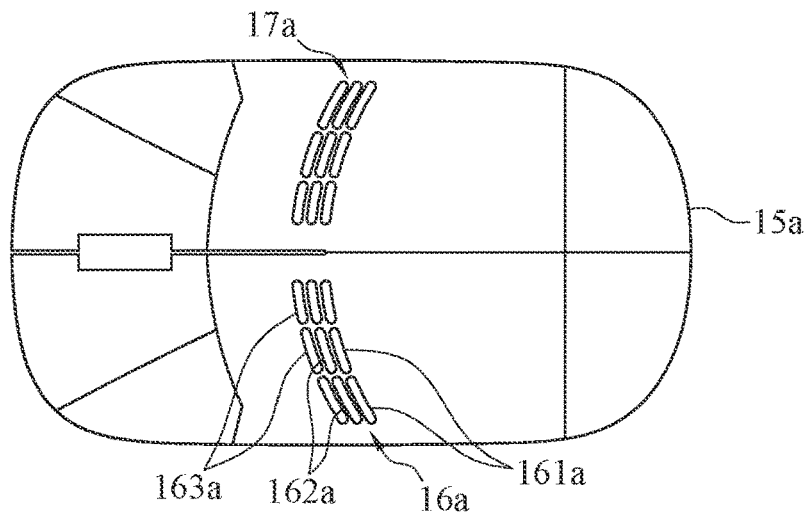
FIG. 7 illustrates a top view of an adhesive layer of a mouse device according to a second embodiment of the instant disclosure.

Alternatively, as shown in FIG. 7, a top view of an adhesive layer of a mouse device according to a second embodiment of the instant disclosure is illustrated. In this embodiment, the hollow portion 16a of the adhesive layer 15a comprises a plurality of first through holes 161a arranged into a line, a plurality of second through holes 162a arranged into a line, and a plurality of third through holes 163a arranged into a line. The first through holes 161a, the second through holes 162a, and the third through holes 163a are spacedly arranged along the width direction of the button 12. Moreover, in this embodiment, each of the first through holes 161a, each of the second through holes 162a, and each of the third through holes 163a are elongated holes, and the long side of the elongated hole extends along the width direction of the button 12. In some embodiments, the first through holes 161a, the second through holes 162a, and the third through holes 163a may be arranged along the length direction of the button 12. Alternatively, in another example, the first through holes 161a, the second through holes 162a, and the third through holes 163a may be arranged side-by-side or not side-by-side (e.g., in an alternated configuration).

Moreover, as shown in FIG. 7, in this embodiment, the hollow portion 17a and the hollow portion 16a have the same structure and are arranged on the adhesive layer 15a symmetrically. For example, the two hollow portions 16a, 17a are symmetrically arranged by taking the extension direction of the gap 112 as the axis of symmetry (referring to FIG. 4). In some embodiments, the structures of the two hollow portions 16a, 17a may be different, or the two hollow portions 16a, 17a may be arranged unsymmetrically.

Figure 8:
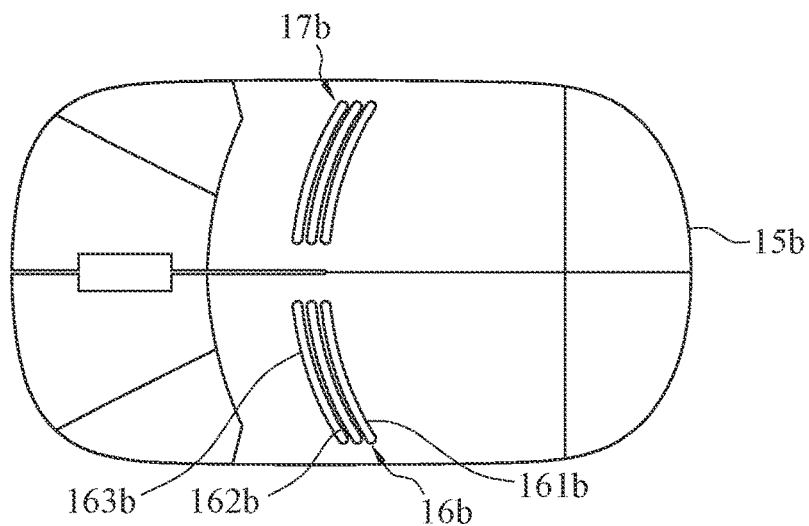
FIG. 8 illustrates a top view of an adhesive layer of a mouse device according to a third embodiment of the instant disclosure.

Alternatively, as shown in FIG. 8, a top view of an adhesive layer of a mouse device according to a third embodiment of the instant disclosure is illustrated. In this embodiment, the hollow portion 16b of the adhesive layer 15b comprises a first through hole 161b, a second through hole 162b, and a third through hole 163b. The first through hole 161b, the second through hole 162b, and the third through hole 163b are elongated holes, the long sides of the elongated holes extend along the length direction of the button 12, and the first through holes 161b, the second through holes 162b, and the third through holes 163b are side-by-side arranged along the length direction of the button 12. In some embodiments, the first through hole 161b, the second through hole 162b, and the third through hole 163b may also be arranged side-by-side along the width direction of the button 12. Alternatively, in another example, the first through hole 161b, the second through hole 162b, and the third through hole 163b may be arranged not side-by-side (e.g., in an alternated configuration).

Furthermore, as shown in FIG. 8, in this embodiment, the hollow portion 17b and the hollow portion 16b have the same structure and are arranged on the adhesive layer 15b symmetrically. For example, the two hollow portions 16b, 17b are symmetrically arranged by taking the extension direction of the gap 112 as the axis of symmetry (referring to FIG. 4). In some embodiments, the structures of the two hollow portions 16b, 17b may be different, or the two hollow portions 16b, 17b may be arranged unsymmetrically.

Figure 9:
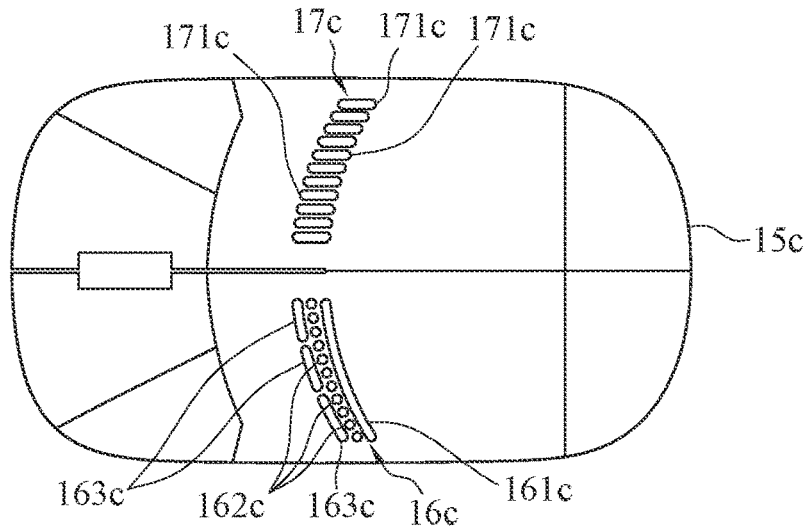
FIG. 9 illustrates a top view of an adhesive layer of a mouse device according to a fourth embodiment of the instant disclosure.

As shown in FIG. 9, a top view of an adhesive layer of a mouse device according to a fourth embodiment of the instant disclosure is illustrated. In this embodiment, the hollow portion 16c of the adhesive layer 15c comprises a first through hole 161c, a plurality of second through holes 162c, and a plurality of third through holes 163c. The first through hole 161c is an elongated hole, and the long side of the elongated hole extends along the width direction of the button 12. The second through holes 162c are round holes with the same size and the second through holes 162c are arranged along the width direction of the button 12. The third through holes 163c are elongated holes. The length of each of the third through holes 163c is shorter than the length of the first through hole 161c, and the third through holes 163c are arranged along the width direction of the button 12. Therefore, in this embodiment, the sizes and the numbers of the first through hole 161c, the second through hole 162c, and the third through hole 163c are different. Moreover, in this embodiment, the structure and the size of the hollow portion 17c are different from the structure and the size of the hollow portion 16c, and the hollow portions 16c, 17c are not symmetrically arranged. Specifically, in this embodiment, the hollow portion 17c comprises a plurality of through holes 171c. The through holes 171c are elongated holes, and the long side of the elongated hole extends along the length direction of the button 12. The through holes 171c are side-by-side arranged into a line along the width direction of the button 12.

In some embodiments, the first through holes 161c, the second through holes 162c, and the third through holes 163c of the hollow portion 16 may be arranged side-by-side or not side-by-side (e.g., in an alternated configuration).

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A mouse device comprising:
   a body;
   a cover plate disposed on the body, wherein the cover plate comprises a button;
   a covering layer covering on the cover plate, wherein a material of the covering layer is different from a material of the cover plate; and
   an adhesive layer bound between the cover plate and the covering layer, wherein the adhesive layer has a hollow portion and a partial adhesive region corresponding to a position of the button, and the hollow portion is formed on the partial adhesive region to correspond to the button.

2. The mouse device according to claim 1, wherein the button comprises a pivot end and a free end opposite to the pivot end, and the hollow portion of the adhesive layer is adjacent to the pivot end.

3. The mouse device according to claim 1, wherein the button comprises an inner surface, and the inner surface has a recessed region.

4. The mouse device according to claim 3, wherein the button comprises a pivot end and a free end opposite to the pivot end, and the recessed region is adjacent to the pivot end.

5. The mouse device according to claim 3, wherein the recessed region further corresponds to the hollow portion.

6. The mouse device according to claim 1, wherein the hollow portion comprises a plurality of through holes, and the through holes are arranged into a line.

7. The mouse device according to claim 6, wherein the through holes have a same size.

8. The mouse device according to claim 1, wherein the hollow portion comprises a plurality of first through holes arranged into a line and a plurality of second through holes arranged into a line, and wherein the first through holes and the second through holes are arranged side-by-side.

9. The mouse device according to claim 8, wherein a size of each of the first through holes is different from a size of each of the second through holes.

10. The mouse device according to claim 1, wherein the cover plate further comprises a second button, the adhesive layer comprises a second hollow portion, and the second hollow portion corresponds to the second button.

11. The mouse device according to claim 10, wherein a position or a size of the hollow portion with respect to the button is different from a position or a size of the second hollow portion with respect to the second button.

12. The mouse device according to claim 1, wherein the covering layer is a leather material layer or a fabric material layer.

\* \* \* \* \*